(12) United States Patent
Trundle (10) Patent No.: US 11,915,171 B2
(45) Date of Patent: Feb. 27, 2024

(54) SYSTEM AND METHOD INTEGRATING SMART VEHICLES WITH A MONITORING SYSTEM

(71) Applicant: Alarm.com Incorporated, Tysons, VA (US)

(72) Inventor: Stephen Scott Trundle, Falls Church, VA (US)

(73) Assignee: Alarm.com Incorporated, Tysons, VA (US)

( * ) Notice: Subject to any disclaimer, the term of this patent is extended or adjusted under 35 U.S.C. 154(b) by 124 days.

(21) Appl. No.: 16/952,163

(22) Filed: Nov. 19, 2020

(65) Prior Publication Data

US 2021/0158250 A1 May 27, 2021

Related U.S. Application Data

(60) Provisional application No. 62/940,726, filed on Nov. 26, 2019.

(51) Int. Cl.
*G06Q 10/0631* (2023.01)
*G06Q 50/30* (2012.01)

(52) U.S. Cl.
CPC . *G06Q 10/06313* (2013.01); *G06Q 10/06315* (2013.01); *G06Q 50/30* (2013.01)

(58) Field of Classification Search
None
See application file for complete search history.

(56) References Cited

U.S. PATENT DOCUMENTS

| | | | |
|---|---|---|---|
| 10,178,890 B1 * | 1/2019 | Andon | B60Q 9/008 |
| 10,366,614 B2 | 7/2019 | Marco et al. | |
| 10,419,878 B1 * | 9/2019 | Sanchez | H04W 4/025 |
| 10,593,206 B2 | 3/2020 | O'Sullivan | |
| 10,825,318 B1 * | 11/2020 | Williams | G08B 21/0484 |
| 10,836,348 B1 * | 11/2020 | Papworth | H04L 12/2827 |
| 11,341,583 B2 * | 5/2022 | Schneider | G06Q 50/01 |
| 2010/0161720 A1 * | 6/2010 | Colligan | H04W 4/02 |
| | | | 711/E12.002 |
| 2016/0364679 A1 | 12/2016 | Cao | |
| 2017/0048376 A1 * | 2/2017 | Logan | H04L 12/2827 |
| 2017/0126837 A1 * | 5/2017 | Wang | H04W 4/025 |
| 2017/0349402 A1 * | 12/2017 | Chapman | B66B 1/3492 |
| 2018/0160297 A1 * | 6/2018 | Geilfuss | G06Q 30/0225 |
| 2018/0165854 A1 * | 6/2018 | Du | G06F 16/00 |

(Continued)

*Primary Examiner* — Sara Grace Brown
(74) *Attorney, Agent, or Firm* — Fish & Richardson P.C.

(57) ABSTRACT

Methods, systems, and apparatus, including computer programs, for a monitoring system that is configured to hail a car from a ride-sharing service. The method comprises determining, based on sensor data from one or more sensors at the property, that a person located at the property is preparing to leave the property, based on historical sensor data, an estimated time that the person will depart the property, determining, based on the estimated time that the person will depart the property, whether a suitable vehicle from a ride-sharing service will be within a predetermined vicinity of the property within a predetermined amount of time of the estimated time that the person will depart the property, receiving data indicating that the person is leaving the property and based on receiving the data indicating that the person is leaving the property, notifying the person that the suitable vehicle is available pick the person up.

19 Claims, 4 Drawing Sheets

(56) References Cited

U.S. PATENT DOCUMENTS

| | | | |
|---|---|---|---|
| 2018/0259352 A1* | 9/2018 | Han | G08G 1/096811 |
| 2019/0052728 A1* | 2/2019 | Cheng | H04L 67/62 |
| 2019/0066250 A1* | 2/2019 | Levy | G01C 21/3626 |
| 2019/0318283 A1* | 10/2019 | Kelly | G06Q 10/1095 |
| 2019/0356506 A1* | 11/2019 | Beach | G06V 10/84 |
| 2019/0387832 A1* | 12/2019 | Andon | G08G 1/07 |
| 2020/0204684 A1* | 6/2020 | Hashimoto | G10L 25/51 |
| 2020/0286199 A1* | 9/2020 | Maddipati | G01C 21/3438 |
| 2020/0344602 A1* | 10/2020 | Li | H04L 67/125 |
| 2020/0364588 A1* | 11/2020 | Knox | H04L 67/565 |
| 2020/0394332 A1* | 12/2020 | Jakobsson | G06F 16/24573 |
| 2021/0072034 A1* | 3/2021 | Meroux | G05D 1/0088 |
| 2021/0096567 A1* | 4/2021 | Ziniti | G05D 1/0212 |

* cited by examiner

SYSTEM AND METHOD INTEGRATING SMART VEHICLES WITH A MONITORING SYSTEM

CROSS-REFERENCE TO RELATED APPLICATION

This application claims the benefit of U.S. Provisional Application No. 62/940,726, filed on Nov. 26, 2019, the contents of which are incorporated by reference herein in its entirety.

BACKGROUND

Multiple forms of transportation can be used by a person to get from an initial location to a target destination. These forms of transportation may include a car the user owns, a car the user rents, a car of a car sharing service, a train, a boat, an airplane, a helicopter, public transportation, among others.

The initial location may include a person's home. The target destination may include any destination of interest including the person's office, a restaurant, a grocery store, a different city, or any other destination.

DETAILED DESCRIPTION

Figure 1:
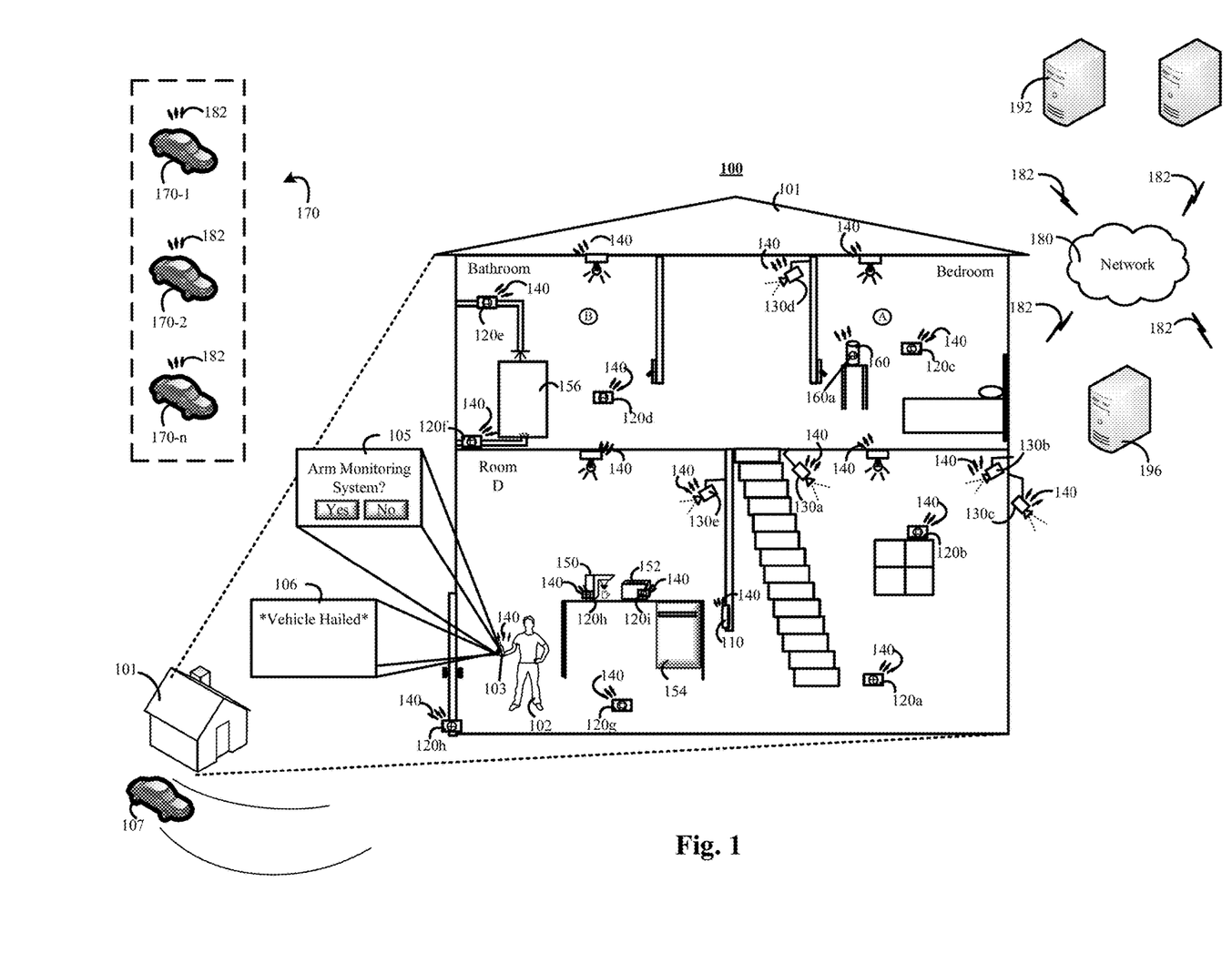
FIG. 1 is an example of a contextual diagram of a monitoring system that is integrated with a vehicle control system to select a particular form of transportation for a person.

FIG. 1 is an example of a contextual diagram of a monitoring system 100 that is integrated with a vehicle control system to select a particular form of transportation for a person. For example, the monitoring system 100 can determine whether to generate a ride-sharing recommendation for a user 102 or automatically start a vehicle at a property where the person is located for the person to drive. In some implementations, if the monitoring system 100 generates a ride-sharing recommendation, the monitoring system 100 may automatically hail a rides-sharing vehicle that will arrive within a predetermined time window of an estimated departure time for the person.

Alternatively, or in addition, in some implementations, if the monitoring system 100 selects ride-sharing service as a form of transportation for the person, the monitoring system 100 may transmit a notification to a device used by the person that prompts the person as to whether the person wants to hail a vehicle from a ride-sharing service. For purposes of this specification, a ride-sharing service may include any vehicle that (i) can pick up the person and take the person to the person's destination and (ii) is not owned by the person. The vehicle may be driven manually by another person, semi-autonomous, or fully-autonomous. In some implementations, there may be other passengers in the ride-sharing vehicle that will "share" a ride in the ride-sharing vehicle with the user if they have a common destination or a destination along a common route. However, in other implementations, the ride-sharing vehicle may be a vehicle that is allocated by the ride-sharing service as being available to give the person a private ride from the person's current property to an intended destination.

The monitoring system 100 includes a user device 103, a property resident's vehicle 107, monitoring system control unit 110, one or more sensors 120a, 120b, 120c, 120d, 120e, 120e, 120g, 120h, 120i, 120j (hereinafter 120a-j), one or more cameras 130a, 130b, 130c, 130d, 130e (hereinafter 130a-e), a local network 140, one or more connected appliances 150, 152, 154, a personal digital assistant 160, a fleet of ride-sharing vehicles 171-1, 172-2, 170-n (wherein "n" is any positive integer greater than 0), a remote network 180, one or more communication links 182, a monitoring application server 190, a central alarm station server 192, and a vehicle control system server 196.

The monitoring system 100 is configured to monitor sensor data generated by one or more sensors 120a-j. For example, the monitoring system control unit 110 (or monitoring application server 190) may detect sensor data generated by one or more of the sensors 120a-j and make an inference about a person's 102 behavior. For example, the monitoring system control unit 110 (or monitoring application server 190) may detect sensor data generated by a motion sensor 120c indicating movement in the bedroom, sensor data generated by a motion sensor 120d, and sensor data generated by one or more water sensors 120e, 120f and determine that a person 102 has gotten out of bed and is taking a shower. The sensors 120a-j installed at the property 101 and capable of generating sensor data may include motion sensors 120a, 120c, 120d, 120g, contact sensors 120b, 120h, water sensors 120e, 120f, energy sensors 120h, 120i, or any other kind of sensor that can be used to generate sensor data indicative of a person's 102 behavior.

Alternatively, or in addition, in some implementations, the sensor data that is analyzed to make an inference about a person's 102 behavior may also include image (or video) data that is generated by one or more cameras 130a-d located at the property 101. For example, images may be analyzed to determine whether the image depicts the presence of a person. Based on the analysis of the image(s), the monitoring system 100 can determine whether or not a person 102 is present in any particular room of the property 101. In some implementations, such one or more cameras can be used instead of motion sensors to determine a person's 102 presence in a room of the property 101. In other implementations, one or more cameras may be used to generate images that can be used to supplement sensor data from a motion sensor. In such implementations, the monitoring system 100 can determine whether a person 102 is present in a room of the property 101 based on sensor data generated by a motion sensor and sensor data generated by one or more cameras.

The monitoring system 100 can detect and log sensor data generated by the sensors 120a-j over time. The monitoring system 100 can analyze the logged sensor data and identify sensor data, sets of sensor data, sequences of sensor data, or combination thereof, that are indicative of particular user behaviors. The analysis may include analysis sensor data, the time the sensor data was generate, date the sensor data was generated, the day of the week the sensor data was generated, or a combination thereof. For example, the monitoring system 100 can analyze sensor data generated by sensors 120a-j that are installed a particular property and determine that when sensor data indicates that there is movement in the bedroom, movement in the bathroom, water use in the bathroom, movement in the kitchen, and appliance use in the kitchen between 6:30 am and 7:30 am on a weekday, then the person 102 is getting ready for work.

During a typical day, the monitoring system 100 may detect user behavior by comparing real-time sensor data generated by sensors 120a-120j located at the property 101 to logged sensor data stored by the monitoring system control unit 110 (or monitoring application server 190). For example, the monitoring system 100 may detect user behavior because the real-time sensor data that is the same as a set of logged sensor data and generated within a same time period as the logged sensor data. Alternatively, the monitoring system 100 may detect user behavior by analyzing a real-time sensor data generated by sensors 120a-120j without reference to historical, logged sensor data. For example, the monitoring system 100 may store a set of rules that define a sensor data sequence that is indicative of a particular behavior. For example, the monitoring system 100 can be programmed to determine, based on sensor data generated by a contact sensor 120h indicating a door has been opened within a particular time period of a particular day as being indicative of a person 102 leaving the property 10. In some implementations, these rules may be generated based on trends identified in the logged sensor data.

The monitoring system 100 may determine, based on the sensor data generated by one or more sensors 120a-120j, that a person 102 is preparing to leave the property. For example, the monitoring system 100 can determine based on (i) sensor data generated by motion sensor 120c that there is movement in the bedroom, (ii) sensor data generated by motion sensor 120d that there is movement in the bathroom, and (iii) sensor data generated by flow rate water sensors 120e, 120f, or both, that water is being used in the bathroom that a person 102 is getting prepared to leave the property 101.

Based on determining, by the monitoring system 100, that the person 102 is getting prepared to leave the property 101, the monitoring system 100 can determine an estimated time that the person 102 will depart the property 101. In some implementations, the estimated time may be determined with reference to logged sensor data. For example, the monitoring system 100 can determine that, based on an analysis of logged sensor data, the person 102 typically leaves within 45 minutes of getting out of the shower. The time the person 102 gets out of the shower may be determined based on a timestamp associated with sensor data generated by one or more flow rate sensors 120e, 120f indicating that water flow is no longer detected by the flow rate sensors 120e, 120f. Alternatively, the time the person 102 gets out of the shower may be determined based on a timestamp associated with a determination by the monitoring system 100 that flow rate sensors 120e, 120f stopped generating sensor data indicative of water flow. The latter scenario may be categorized as the monitoring system detecting an absence of sensor data being generated that is indicative of water flow. The time the person 102 has historically left the property 101 may be determined based on, e.g., a timestamp generated associated with data indicating that the person 102 disarmed the monitoring system, a timestamp associated with data indicating that the person 102 armed the monitoring system, or the timestamp associated with sensor data generated by a contact sensor 120h when a person 102 opens the door to leave the property 101.

The monitoring system 100 can determine whether a suitable vehicle 170-1, 170-2, 170-n from a set of vehicles 170 provided by a ride-sharing service will be within a predetermined vicinity of the property 101 within a predetermined amount of time of the estimated time that the person 102 will depart the property 101. The predetermined amount of time of the estimated property may include a time window that is before or after the person's estimated departure time. For example, if the estimated departure time is 8:00 am, a time that is within a predetermined amount of time of the estimated departure time may include 7:55 am to 8:05 am. In some implementations, this predetermined amount of time may be customizable by the person 102 using a mobile app installed on the person's 102 mobile device 103. Alternatively, the predetermined of time may be set using a web portal. In some implementations, the predetermined amount of time may be preset to one or more default values by the monitoring system 100.

Determining whether a suitable vehicle 170-1, 170-2, 170-n will be within a predetermined vicinity of the property 101 within a predetermined amount of time of the estimated departure time includes an analysis of a variety of parameters that include the each vehicle's current locations, each vehicle's current routes, each vehicle's availability (e.g., current job queue), each vehicle's average speed, each vehicle's passenger status, traffic conditions, weather conditions, the property 101 location, or a combination thereof. The monitoring system 100 can determine, based on one or more of the aforementioned parameters, whether one of the vehicles 170-1, 170-2, 170-n can arrive at the property 101 within a predetermined amount of time of the estimated departure time of the user 102.

In the example of FIG. 1, the monitoring system 100 determines that at least one of the vehicles such as vehicle 170-1 will be within a predetermined vicinity of the property 101 within a predetermined amount of time of the estimated departure time of the person 102. The monitoring system 100 can identify this vehicle 170-1 as a suitable vehicle since the vehicle 170-1 will be within a predetermined distance of the property 101 within a predetermined amount of time of the estimated departure time of the person 1012. The predetermined vicinity of the property 101 may include, for example, a predetermined distance from the property 101 that will enable the vehicle to travel to the property 101 within the predetermined amount of time of the estimated departure time of the person 102. Based on determining that the vehicle 170-1 will be within a predetermined vicinity of the property 101 within a predetermined amount of time of the estimated departure time of the person 102, the monitoring system 100 can automatically transmit a request that hails vehicle 170-1.

The monitoring system 100 may subsequently receive data indicating that the person 102 is leaving the property 101. The monitoring system may determine that a person 102 is leaving the property based on, e.g., a determination that the person 102 disarmed the monitoring system or a determination that the person 102 armed the monitoring system. The person 102 may arm or disarm the monitoring system by using a mobile application on the mobile device 103 that provides the graphical user interface 105. The graphical user interface 105 may provide the user with graphical icons that, when selected, arm or disarm the monitoring system. Arming the monitoring system may include, e.g., setting the monitoring system control unit 110 or monitoring application server 190 to trigger an alarm event based on sensor data generated at the property 101 indicating that a door has opened, a window has opened, motion has been detected, glass has been broken, or the like. Disarming the monitoring system may include, e.g., setting the monitoring system control unit 110 or monitoring application server 190 to not trigger an alarm event based on sensor data generated at the property 101 indicating that a door has opened, a window has opened, motion has been detected, glass has been broken, or the like.

Alternatively, or in addition, the monitoring system 100 may determine that a person 102 is leaving the property based on sensor data generated by a contact sensor 120h when a person 102 opens the door to leave the property 101. Alternatively, or in addition, the monitoring system 100 may determine that the person 102 left the property 101 based on a determination that motion is not detected in the property 101, no human presence is detected in the property 101, or the like. A determination as to whether human presence is detected in the property may be determined based on, e.g., the analysis of image data generated by one or more cameras (e.g., one or more cameras 130a-e), the analysis audio data captured by one or more microphones (e.g., a microphone 160a of the digital assistant device 160, one or more microphones of one or more cameras 130a-e), or the like indicating that there is not a human presence detected at the property 101.

Based on determining that the person 102 is leaving the property 101, the monitoring system 100 can transmit a notification to a mobile device 103 of the person 102 that notifies the person that a suitable vehicle 170-1 is available to pick up the person 102. The notification may include data that, when rendered by the mobile device 103, provides a graphical element 106 that alerts the person 102 that the vehicle 170-1 has been hailed. The mobile device 103 may include a smartphone, a tablet, a smartwatch, a pair of smartglasses, or the like.

In some implementations, the monitoring system 100 may not automatically transmit a hailing request to a suitable vehicle such as vehicle 170-1. Instead, the monitoring system 100 may generate and transmit a notification to the mobile device 103 that prompts the person 102 as to whether a vehicle that has been identified as a suitable vehicle 170-1 should be hailed. In such implementations, the vehicle 170-1 will only be hailed in response to data received from the mobile device 103 indicating that the person 102 has indicated that the vehicle 170-1 should be hailed.

Figure 2:
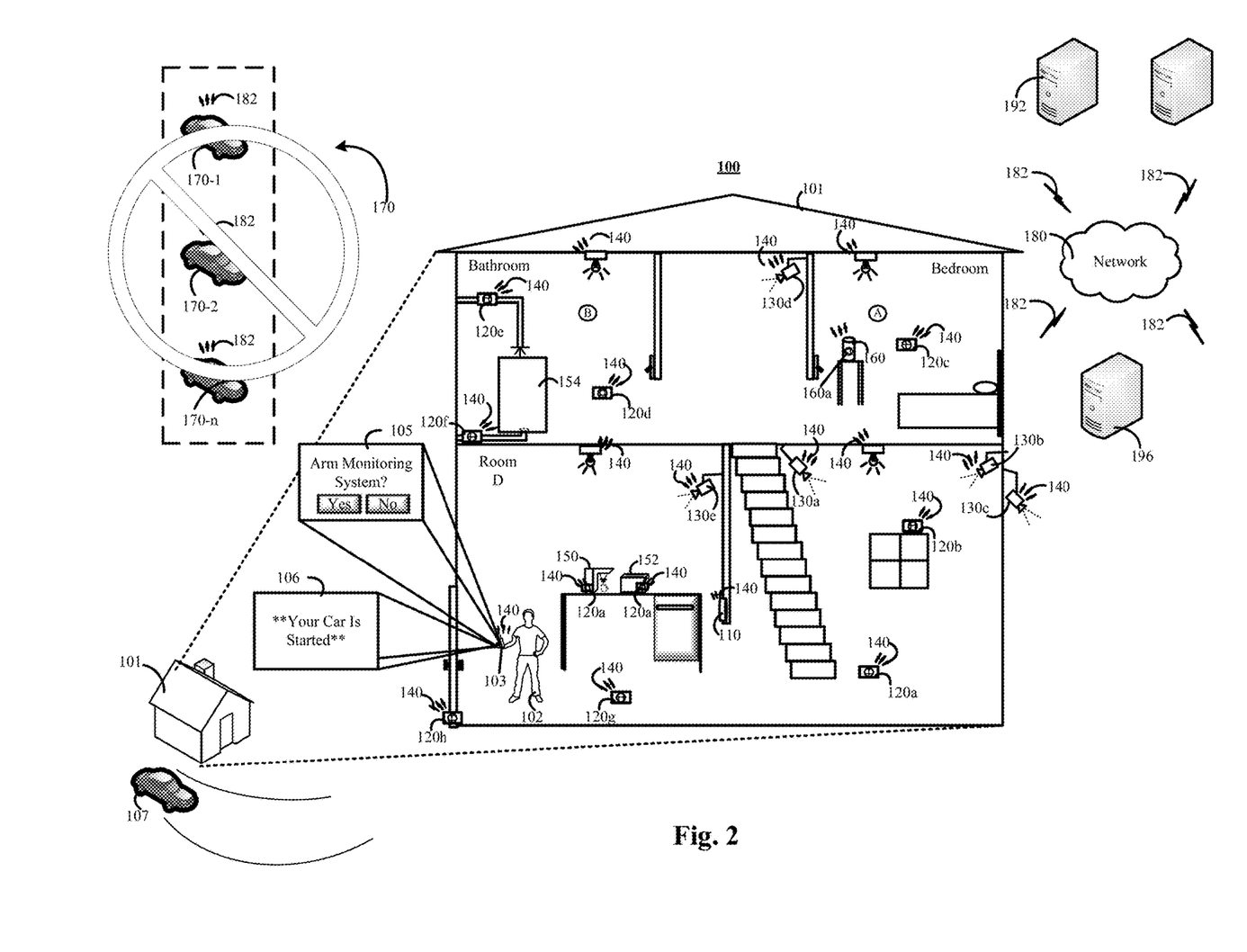
FIG. 2 is another example of a contextual diagram of a monitoring system that is integrated with a vehicle control system to select a particular form of transportation for a person.

FIG. 2 is another example of a contextual diagram of a monitoring system that is integrated with a vehicle control system 200 to select a particular form of transportation for a person.

The example of system 200 set forth in FIG. 2 is the same system set forth with respect to system 100 of FIG. 1. However, the example of FIG. 2 provides an example where no ride-sharing vehicles 170-1 to 170-n are determined to be within a predetermined vicinity of the property 101 at an estimated time when the person 102 will depart the property 101.

In this example, the monitoring unit 110 (or monitoring application server 192) will not transmit a request to hail a vehicle such as vehicle 170-1 of the ride sharing service. This is because the vehicle will not be within a predetermined vicinity of the property 101 when the person 102 is set to leave the property 101.

Instead, lacking ride sharing options, the monitoring unit 110 (or monitoring application server 192) will transmit an instruction to a vehicle 107 that instructs the vehicle 107 to start the vehicle's engine. The vehicle 107 may be the person's 102 personal vehicle that the person 102 owns, leases, or the like. Such an instruction may be transmitted upon a determination, by the monitoring unit 110 (or monitoring application server 192), that the person 102 is leaving the property 101. For example, such an instruction may be transmitted when the person 102 arms the monitoring system 200 using the interface 105 of the person's 102 user device 103. Alternatively, the instruction to start the vehicle's 107 engine may be transmitted based on the estimated time of the person's 102 departure from the property 101. In such implementations, the instruction to start the vehicle's engine may be transmitted before the person 102 has armed the monitoring system and based on the estimated time of the person's 102 departure in an effort to allow the vehicle's engine to warm up prior to departure.

Figure 3:
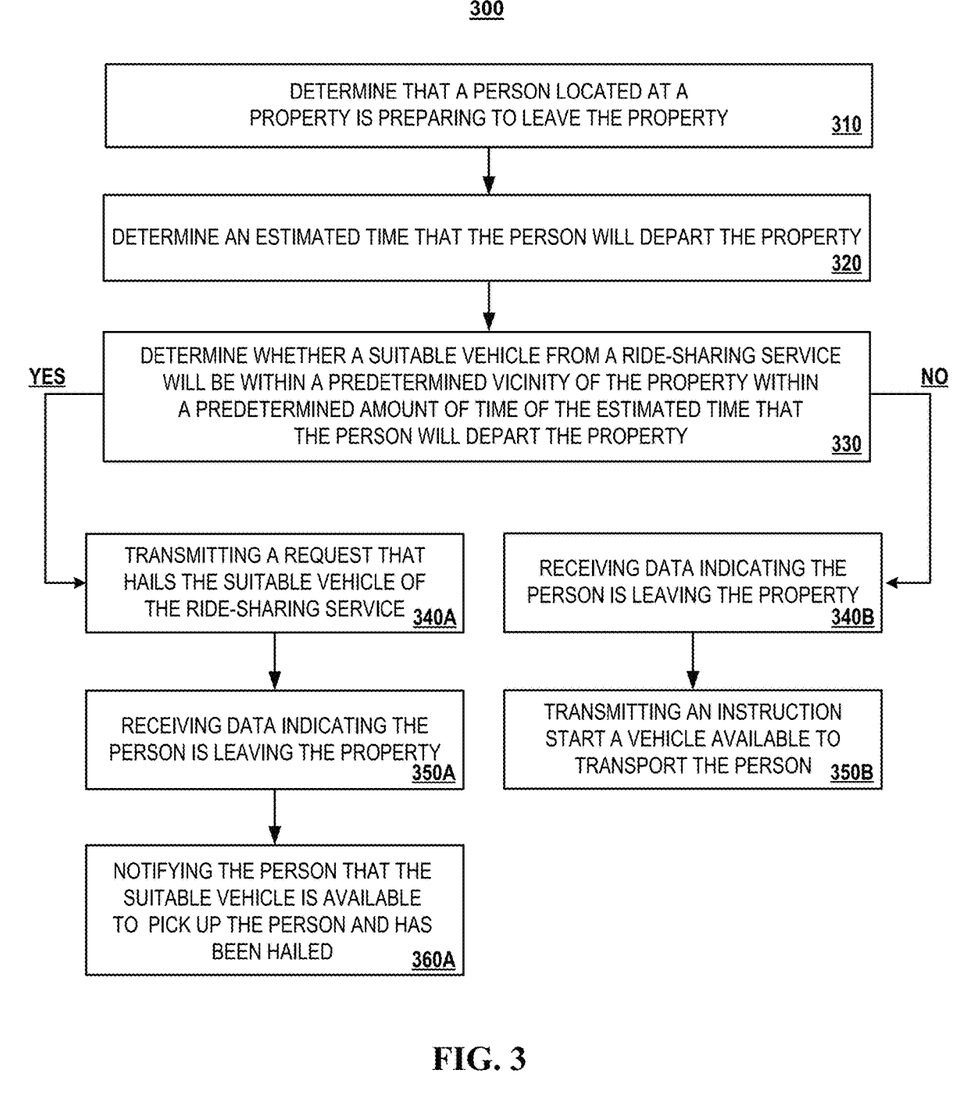
FIG. 3 is a flowchart of an example of a process for selecting a particular form of transportation for a person by a monitoring system that is integrated with a vehicle control system.

FIG. 3 is a flowchart of an example of a process 300 for selecting a particular form of transportation for a person by a monitoring system that is integrated with a vehicle control system. Briefly, and as described in more detail below, the process may include determining that a person located at a property is preparing to leave the property (310), determining an estimated time that the person will depart the property (320), and determining whether a suitable vehicle from a ride-sharing service will be within a predetermined vicinity of the property within a predetermined amount of time of the estimated time that the person will depart the property (330).

The process may include determining that a person located at a property is preparing to leave the property (310). For example, the monitoring system 100 may determine that the person 102 is preparing to leave the property 101. In some implementations, determining that a person located at the property is preparing to leave the property includes determining that the person located at the property is preparing to leave the property based on sensor data from both a motion sensor and a flow rate water sensor. For example, the monitoring system 100 can determine based on (i) sensor data generated by motion sensor 120c that there is movement in the bedroom, (ii) sensor data generated by motion sensor 120d that there is movement in the bathroom, and (iii) sensor data generated by flow rate water sensors 120e, 120f, or both, that water is being used in the bathroom that a person 102 is getting prepared to leave the property 101.

The process may include determining an estimated time that the person will depart the property (320). For example, the monitoring system 100 can determine that, the person 102 is estimated to leave at 8:00 am. In some implementations, the estimate may be determined based on historical sensor data that indicates when the person previously left the property. For example, the monitoring system 100 can determine that, based on an analysis of logged sensor data, the person 102 typically leaves within 45 minutes of getting out of the shower and that the person 102 got out of the shower at 7:15 am.

The process may include determining whether a suitable vehicle from a ride-sharing service will be within a predetermined vicinity of the property within a predetermined amount of time of the estimated time that the person will depart the property (330). For example, the monitoring system 100 may determine, if the estimated departure time is 8:00 am, whether a vehicle will be within two miles of the property 101 within five minutes of 8:00 am.

In response to determining that a suitable vehicle from a ride-sharing service will be within a predetermined vicinity of the property within a predetermined amount of time of the estimated time that the person will depart the property, transmitting a request that hails the suitable vehicle of the ridesharing service (340A), receiving data indicating the person is leaving the property (350A), and transmitting a notification to a user device of the person that, when processed by the user device, is configured to instruct the user device to generate an alert notification that alerts the person that the suitable vehicle is available to pick up the person and has been hailed (360A).

For example, based on determining that the vehicle 170-1 will be within a predetermined vicinity of the property 101 within a predetermined amount of time of the estimated departure time of the person 102, the monitoring system 100 can automatically transmit a request that hails vehicle 170-1, the monitoring system may determine that a person 102 is leaving the property, and based on determining that the person 102 is leaving the property 101, the monitoring system 100 can transmit a notification to a mobile device 103 of the person 102 that notifies the person that a suitable vehicle 170-1 is available to pick up the person 102.

In some implementations, receiving, by the monitoring system, data indicating that the person is leaving the property includes receiving an indication that the monitoring system has been armed. For example, the monitoring system may determine that a person 102 is leaving the property based on a determination that the person 102 armed the monitoring system. In some implementations, receiving, by the monitoring system, data indicating that the person is leaving the property includes receiving sensor data that indicates that a front door of the property has been opened. For example, the monitoring system 100 may determine that a person 102 is leaving the property based on sensor data generated by a contact sensor 120h when a person 102 opens the door to leave the property 101.

Alternatively, in response to determining that a suitable vehicle from a ride-sharing service will not be within a predetermined vicinity of the property within a predetermined amount time of the estimated time that the person will depart the property, receiving data indicating that the person is leaving the property (340B), and transmitting an instruction to a vehicle that is available to transport the person (350B), wherein the instruction, when processed by a control unit of the vehicle, is configured to trigger ignition of the vehicle's engine.

For example, the monitoring system may determine that a person 102 is leaving the property based on a determination that the person 102 armed the monitoring system and, determining that ride sharing options are lacking, the monitoring unit 110 (or monitoring application server 192) may transmit an instruction to a vehicle 107 that instructs the vehicle 107 to start the vehicle's engine.

Figure 4:
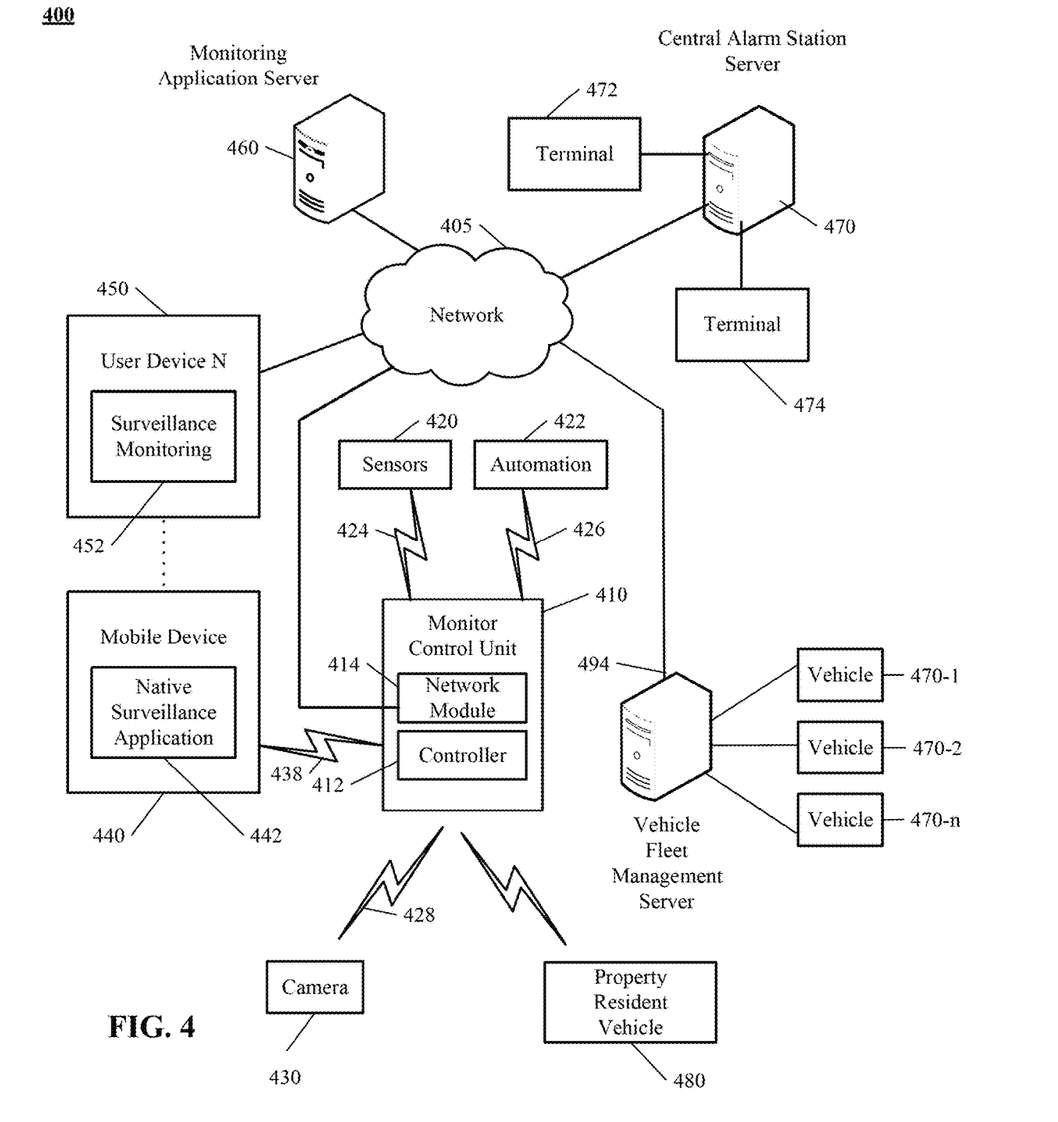
FIG. 4 is a block diagram of monitoring system components that can be used to implement a monitoring system that is integrated with a vehicle control system to select a particular form of transportation for a person.

FIG. 4 is a block diagram of monitoring system components that can be used to implement a monitoring system that is integrated with a vehicle control system to select a particular form of transportation for a person.

The electronic system 400 includes a network 405, a monitoring system control unit 410, one or more user devices 440, 450, a monitoring application server 460, and a central alarm station server 470. In some examples, the network 405 facilitates communications between the monitoring system control unit 410, the one or more user devices 440, 450, the monitoring application server 460, and the central alarm station server 470.

In some implementations, the system 400 may also include the vehicle fleet management server 494 that is configured to communicate with one or more vehicles 470-1, 470-2, 470-n of a ride-sharing service. In such implementations, the monitoring control unit 410, the monitoring application server 460, or one of the user devices 440, 450 are configured to communicate with the vehicle fleet management server 494. For example, the monitoring control unit 410, the monitoring application server 460, or one of the user devices 440, 450 can request the location information of one or more of the vehicles 470-1, 470-2, 470-n from the vehicle management server 494 and determine, based on the location information, whether one of the vehicles 470-1, 470-2, 470-n will be within a predetermined distance of a property of a user of one or more of the user devices 440, 450 at an estimated time of departure of the user from the property. Alternatively, or in addition, the monitoring application server 460, or one of the user devices 440, 450 may request the location of each respective vehicle 470-1, 470-2, 470-n directly from the respective vehicles 470-1, 470-2, 470-n.

In some implementations, the monitoring application server 460, or one of the user devices 440, 450 may request additional information from the vehicle fleet management server 494 (or the respective vehicles 470-1, 470-2, 470-n) for use in determining whether one or more of the vehicles 470-1, 470-2, 470-n will be within a predetermined vicinity of the property at an estimated time of departure of the user. Such additional information may include, for example, a ride queue of each of the vehicles indicating whether each respective vehicles have ride requests pending.

The network 405 is configured to enable exchange of electronic communications between devices connected to the network 405. For example, the network 405 may be configured to enable exchange of electronic communications between the monitoring system control unit 410, the one or more user devices 440, 450, the monitoring application server 460, and the central alarm station server 470. The network 405 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 405 may include multiple networks or subnetworks, each of which may include, for example, a wired or wireless data pathway. The network 405 may include a circuit-switched network, a packet-switched data network, or any other network able to carry electronic communications (e.g., data or voice communications). For example, the network 405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 405 may include one or more networks that include wireless data channels and wireless voice channels. The network 405 may be a wireless network, a broadband network, or a combination of networks including a wireless network and a broadband network.

The monitoring system control unit 410 includes a controller 412 and a network module 414. The controller 412 is configured to control a monitoring system (e.g., a home alarm or security system) that includes the monitoring system control unit 410. In some examples, the controller 412 may include a processor or other control circuitry configured to execute instructions of a program that controls operation of an alarm system. In these examples, the controller 412 may be configured to receive input from sensors, detectors, or other devices included in the alarm system and control operations of devices included in the alarm system or other household devices (e.g., a thermostat, an appliance, lights, etc.). For example, the controller 412 may be configured to control operation of the network module 414 included in the monitoring system control unit 410.

Based on an evaluation of current sensor data from the sensors 420, the monitoring system control unit 410 may determine whether a user is preparing to leave the property. Based on this determination, the monitoring system control unit 410 can determine whether a vehicle 470-1, 470-2, 470-n will be within a predetermined vicinity of the property where the user is located within a predetermined time of the estimated time of the user's departure from the property. If the monitoring system control unit 410 determines that a vehicle 470-1, 470-2, 470-n will be within a predetermined vicinity of the property within a predetermined amount of time of the estimated time, the monitoring system control unit 410 can either (i) automatically hail the vehicle that will be within the predetermined vicinity within the predetermined amount of time of the estimated time or (ii) prompt the user via a notification sent to one of the user devices 440, 450 to ask the user whether the user wants to vehicle to be hailed. If the prompt is presented, the monitoring system control unit 410 may be configured to receive a response provided by the user of the device indicating that the vehicle should be hailed (e.g., a selection of a graphical icon, an affirmative voice response, or the like), and based on the response transmit a hailing request for the vehicle to either the vehicle fleet management server 494 or one or more of the vehicles 470-1, 470-2, 470-n.

Alternatively, if a vehicle 470-1, 470-2, 470-n is determined to not be within a predetermined vicinity of the property within a predetermined amount of time of the estimated time, then the monitoring system control unit 410 can transmit an instruction to the property resident's vehicle 480 that instructs the property resident's vehicle 480 to start its engine.

In some implementations, notifications, instructions, or hailing requests may be transmitted by the monitoring system control unit 410 only after the monitoring system 400 has been armed. This is because the arming of the monitoring system 400 can provide an indication that the user is leaving the property. Alternatively, the notifications, instructions, or hailing requests capable of being transmitted by the monitoring system 400 may be transmitted by the monitoring system control unit 410 based on the estimated departure time of the user and without reference to whether the monitoring system 400 has been armed.

The above actions of transmitting notifications that a vehicle 470-1, 470-2, 470-n is available for hailing, transmitting instructions to start a vehicle 480, or transmitting a hailing request are described as being performed by the application server 460. However, other components of system 410 can also provide the notifications, instructions to start the vehicle 480, or hailing requests. For example, either the monitoring application server 460 or the user device 440, 450 may be configured to perform any of the same operations described herein as being performed by the monitoring system control unit 410. The communications between the monitoring system control unit 410, the monitoring application server 460, and the user device 440, 450 and the vehicles 470-', 470-2, 470-n may be directly across one or more networks 405 or indirectly via the network 405 and the vehicle fleet management server 494. The vehicle fleet management server 494 may also be configured to communicate with the vehicles 470-1, 470-2, 470-n using one or more networks 405.

The network module 414 is a communication device configured to exchange communications over the network 405. The network module 414 may be a wireless communication module configured to exchange wireless communications over the network 405. For example, the network module 414 may be a wireless communication device configured to exchange communications over a wireless data channel and a wireless voice channel. In this example, the network module 414 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 414 also may be a wired communication module configured to exchange communications over the network 405 using a wired connection. For instance, the network module 414 may be a modem, a network interface card, or another type of network interface device. The network module 414 may be an Ethernet network card configured to enable the monitoring system control unit 410 to communicate over a local area network and/or the Internet. The network module 414 also may be a voiceband modem configured to enable the alarm panel to communicate over the telephone lines of Plain Old Telephone Systems (POTS).

The monitoring system that includes the monitoring system control unit 410 includes one or more sensors or detectors. For example, the monitoring system may include multiple sensors 420. The sensors 420 may include a contact sensor, a motion sensor, a glass break sensor, or any other type of sensor included in an alarm system or security system. The sensors 420 also may include an environmental sensor, such as a temperature sensor, a water sensor, a rain sensor, a wind sensor, a light sensor, a smoke detector, a carbon monoxide detector, an air quality sensor, etc. The sensors 420 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 420 may include a radio-frequency identification (RFID) sensor that identifies a particular article that includes a pre-assigned RFID tag.

The monitoring system control unit 410 communicates with the module 422 and the camera 430 to perform surveillance or monitoring. The module 422 is connected to one or more devices that enable home automation control. For instance, the module 422 may be connected to one or more lighting systems and may be configured to control operation of the one or more lighting systems. Also, the module 422 may be connected to one or more electronic locks at the property and may be configured to control operation of the one or more electronic locks (e.g., control Z-Wave locks using wireless communications in the Z-Wave protocol. Further, the module 422 may be connected to one or more appliances at the property and may be configured to control operation of the one or more appliances. The module 422 may include multiple modules that are each specific to the type of device being controlled in an automated manner. The module 422 may control the one or more devices based on commands received from the monitoring system control unit 410. For instance, the module 422 may cause a lighting system to illuminate an area to provide a better image of the area when captured by a camera 430.

The camera 430 may be a video/photographic camera or other type of optical sensing device configured to capture images. For instance, the camera 430 may be configured to capture images of an area within a building monitored by the monitoring system control unit 410. The camera 430 may be configured to capture single, static images of the area and also video images of the area in which multiple images of the area are captured at a relatively high frequency (e.g., thirty images per second). The camera 430 may be controlled based on commands received from the monitoring system control unit 410.

The camera 430 may be triggered by several different types of techniques. For instance, a Passive Infra Red (PIR) motion sensor may be built into the camera 430 and used to trigger the camera 430 to capture one or more images when motion is detected. The camera 430 also may include a microwave motion sensor built into the camera and used to trigger the camera 430 to capture one or more images when motion is detected. The camera 430 may have a "normally open" or "normally closed" digital input that can trigger capture of one or more images when external sensors (e.g., the sensors 420, PIR, door/window, etc.) detect motion or other events. In some implementations, the camera 430 receives a command to capture an image when external devices detect motion or another potential alarm event. The camera 430 may receive the command from the controller 412 or directly from one of the sensors 420.

In some examples, the camera 430 triggers integrated or external illuminators (e.g., Infra Red, Z-wave controlled "white" lights, lights controlled by the module 422, etc.) to improve image quality when the scene is dark. An integrated or separate light sensor may be used to determine if illumination is desired and may result in increased image quality.

The camera 430 may be programmed with any combination of time/day schedules, system "arming state", or other variables to determine whether images should be captured or not when triggers occur. The camera 430 may enter a low-power mode when not capturing images. In this case, the camera 430 may wake periodically to check for inbound messages from the controller 412. The camera 430 may be powered by internal, replaceable batteries if located remotely from the monitoring control unit 410. The camera 430 may employ a small solar cell to recharge the battery when light is available. Alternatively, the camera 430 may be powered by the controller's 412 power supply if the camera 430 is co-located with the controller 412.

In some implementations, the camera 430 communicates directly with the monitoring application server 460 over the Internet. In these implementations, image data captured by the camera 430 does not pass through the monitoring system control unit 410 and the camera 430 receives commands related to operation from the monitoring application server 460.

The sensors 420, the module 422, and the camera 430 communicate with the controller 412 over communication links 424, 426, 432, 484, and 486. The communication links 424, 426, 428, 432, 484, and 486 may be a wired or wireless data pathway configured to transmit signals from the sensors 420, the module 422, and the camera 430 to the controller 412. The sensors 420, the module 422, and the camera 430 may continuously transmit sensed values to the controller 412, periodically transmit sensed values to the controller 412, or transmit sensed values to the controller 412 in response to a change in a sensed value.

The communication links 424, 426, 428, 432, 484, and 486 may include a local network. The sensors 420, the module 422, and the camera 430, and the controller 412 may exchange data and commands over the local network. The local network may include 802.11 "WiFi" wireless Ethernet (e.g., using low-power WiFi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring application server 460 is an electronic device configured to provide monitoring services by exchanging electronic communications with the monitoring system control unit 410, the one or more user devices 440, 450, and the central alarm station server 470 over the network 405. For example, the monitoring application server 460 may be configured to monitor events (e.g., alarm events) generated by the monitoring system control unit 410. In this example, the monitoring application server 460 may exchange electronic communications with the network module 414 included in the monitoring system control unit 410 to receive information regarding events (e.g., alarm events) detected by the monitoring system control unit 410. The monitoring application server 460 also may receive information regarding events (e.g., alarm events) from the one or more user devices 440, 450.

In some examples, the monitoring application server 460 may route alarm data received from the network module 414 or the one or more user devices 440, 450 to the central alarm station server 470. For example, the monitoring application server 460 may transmit the alarm data to the central alarm station server 470 over the network 405.

The monitoring application server 460 may store sensor and image data received from the monitoring system and perform analysis of sensor and image data received from the monitoring system. Based on the analysis, the monitoring application server 460 may communicate with and control aspects of the monitoring system control unit 410 or the one or more user devices 440, 450.

The central alarm station server 470 is an electronic device configured to provide alarm monitoring service by exchanging communications with the monitoring system control unit 410, the one or more mobile devices 440, 450, and the monitoring application server 460 over the network 405. For example, the central alarm station server 470 may be configured to monitor alarm events generated by the monitoring system control unit 410. In this example, the central alarm station server 470 may exchange communications with the network module 414 included in the monitoring system control unit 410 to receive information regarding alarm events detected by the monitoring system control unit 410. The central alarm station server 470 also may receive information regarding alarm events from the one or more mobile devices 440, 450 and/or the monitoring application server 460.

The central alarm station server 470 is connected to multiple terminals 472 and 474. The terminals 472 and 474 may be used by operators to process alarm events. For example, the central alarm station server 470 may route alarm data to the terminals 472 and 474 to enable an operator to process the alarm data. The terminals 472 and 474 may include general-purpose computers (e.g., desktop personal computers, workstations, or laptop computers) that are configured to receive alarm data from a server in the central alarm station server 470 and render a display of information based on the alarm data. For instance, the controller 412 may control the network module 414 to transmit, to the central alarm station server 470, alarm data indicating that a sensor 420 detected a door opening when the monitoring system was armed. The central alarm station server 470 may receive the alarm data and route the alarm data to the terminal 472 for processing by an operator associated with the terminal 472. The terminal 472 may render a display to the operator that includes information associated with the alarm event (e.g., the name of the user of the alarm system, the address of the building the alarm system is monitoring, the type of alarm event, etc.) and the operator may handle the alarm event based on the displayed information.

In some implementations, the terminals 472 and 474 may be mobile devices or devices designed for a specific function. Although FIG. 4 illustrates two terminals for brevity, actual implementations may include more (and, perhaps, many more) terminals.

The one or more user devices 440, 450 are devices that host and display user interfaces. For instance, the user device 440 is a mobile device that hosts one or more native applications (e.g., the native surveillance application 442). The user device 440 may be a cellular phone or a non-cellular locally networked device with a display. The user device 440 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 440 may perform functions unrelated to the monitoring system, such as placing personal telephone calls, playing music, playing video, displaying pictures, browsing the Internet, maintaining an electronic calendar, etc.

The user device 440 includes a native surveillance application 442. The native surveillance application 442 refers to a software/firmware program running on the corresponding mobile device that enables the user interface and features described throughout. The user device 440 may load or install the native surveillance application 442 based on data received over a network or data received from local media. The native surveillance application 442 runs on mobile devices platforms, such as iPhone, iPod touch, Blackberry, Google Android, Windows Mobile, etc. The native surveillance application 442 enables the user device 440 to receive and process image and sensor data from the monitoring system.

The user device 450 may be a general-purpose computer (e.g., a desktop personal computer, a workstation, or a laptop computer) that is configured to communicate with the monitoring application server 460 and/or the monitoring system control unit 410 over the network 405. The user device 450 may be configured to display a surveillance monitoring user interface 452 that is generated by the user device 450 or generated by the monitoring application server 460. For example, the user device 450 may be configured to display a user interface (e.g., a web page) provided by the monitoring application server 460 that enables a user to perceive images captured by the camera 430 and/or reports related to the monitoring system. Although FIG. 4 illustrates two user devices for brevity, actual implementations may include more (and, perhaps, many more) or fewer user devices.

In some implementations, the one or more user devices 440, 450 communicate with and receive monitoring system data from the monitoring system control unit 410 using the communication link 438. For instance, the one or more user devices 440, 450 may communicate with the monitoring system control unit 410 using various local wireless protocols such as wifi, Bluetooth, zwave, zigbee, HomePlug (ethernet over powerline), or wired protocols such as Ethernet and USB, to connect the one or more user devices 440, 450 to local security and automation equipment. The one or more user devices 440, 450 may connect locally to the monitoring system and its sensors and other devices. The local connection may improve the speed of status and control communications because communicating through the network 405 with a remote server (e.g., the monitoring application server 460) may be significantly slower.

Although the one or more user devices 440, 450 are shown as communicating with the monitoring system control unit 410, the one or more user devices 440, 450 may communicate directly with the sensors and other devices controlled by the monitoring system control unit 410. In some implementations, the one or more user devices 440, 450 replace the monitoring system control unit 410 and perform the functions of the monitoring system control unit 410 for local monitoring and long range/offsite communication.

In other implementations, the one or more user devices 440, 450 receive monitoring system data captured by the monitoring system control unit 410 through the network 405. The one or more user devices 440, 450 may receive the data from the monitoring system control unit 410 through the network 405 or the monitoring application server 460 may relay data received from the monitoring system control unit 410 to the one or more user devices 440, 450 through the network 405. In this regard, the monitoring application server 460 may facilitate communication between the one or more user devices 440, 450 and the monitoring system.

In some implementations, the one or more user devices 440, 450 may be configured to switch whether the one or more user devices 440, 450 communicate with the monitoring system control unit 410 directly (e.g., through link 438) or through the monitoring application server 460 (e.g., through network 405) based on a location of the one or more user devices 440, 450. For instance, when the one or more user devices 440, 450 are located close to the monitoring system control unit 410 and in range to communicate directly with the monitoring system control unit 410, the one or more user devices 440, 450 use direct communication. When the one or more user devices 440, 450 are located far from the monitoring system control unit 410 and not in range to communicate directly with the monitoring system control unit 410, the one or more user devices 440, 450 use communication through the monitoring application server 460.

Although the one or more user devices 440, 450 are shown as being connected to the network 405, in some implementations, the one or more user devices 440, 450 are not connected to the network 405. In these implementations, the one or more user devices 440, 450 communicate directly with one or more of the monitoring system components and no network (e.g., Internet) connection or reliance on remote servers is needed.

In some implementations, the one or more user devices 440, 450 are used in conjunction with only local sensors and/or local devices in a house. In these implementations, the system 400 only includes the one or more user devices 440, 450, the sensors 420, the module 422, and the camera 430. The one or more user devices 440, 450 receive data directly from the sensors 420, the module 422, and the camera 430 and sends data directly to the sensors 420, the module 422, and the camera 430. The one or more user devices 440, 450 provide the appropriate interfaces/processing to provide visual surveillance and reporting.

In other implementations, the system 400 further includes network 405 and the sensors 420, the module 422, and the camera 430 are configured to communicate sensor and image data to the one or more user devices 440, 450 over network 405 (e.g., the Internet, cellular network, etc.). In yet another implementation, the sensors 420, the module 422, and the camera 430 (or a component, such as a bridge/router) are intelligent enough to change the communication pathway from a direct local pathway when the one or more user devices 440, 450 are in close physical proximity to the sensors 420, the module 422, and the camera 430 to a pathway over network 405 when the one or more user devices 440, 450 are farther from the sensors 420, the module 422, and the camera 430. In some examples, the system leverages GPS information from the one or more user devices 440, 450 to determine whether the one or more user devices 440, 450 are close enough to the sensors 420, the module 422, and the camera 430 to use the direct local pathway or whether the one or more user devices 440, 450 are far enough from the sensors 420, the module 422, and the camera 430 that the pathway over network 405 is required. In other examples, the system leverages status communications (e.g., pinging) between the one or more user devices 440, 450 and the sensors 420, the module 422, and the camera 430 to determine whether communication using the direct local pathway is possible. If communication using the direct local pathway is possible, the one or more user devices 440, 450 communicate with the sensors 420, the module 422, and the camera 430 using the direct local pathway. If communication using the direct local pathway is not possible, the one or more user devices 440, 450 communicate with the sensors 420, the module 422, and the camera 430 using the pathway over network 405.

In some implementations, the system 400 provides end users with access to images captured by the camera 430 to aid in decision making. The system 400 may transmit the images captured by the camera 430 over a wireless WAN network to the user devices 440, 450. Because transmission over a wireless WAN network may be relatively expensive, the system 400 uses several techniques to reduce costs while providing access to significant levels of useful visual information.

In some implementations, a state of the monitoring system and other events sensed by the monitoring system may be used to enable/disable video/image recording devices (e.g., the camera 430). In these implementations, the camera 430 may be set to capture images on a periodic basis when the alarm system is armed in an "Away" state, but set not to capture images when the alarm system is armed in a "Stay" state or disarmed. In addition, the camera 430 may be triggered to begin capturing images when the alarm system detects an event, such as an alarm event, a door opening event for a door that leads to an area within a field of view of the camera 430, or motion in the area within the field of view of the camera 430. In other implementations, the camera 430 may capture images continuously, but the captured images may be stored or transmitted over a network when needed.

The invention claimed is:

1. A monitoring system for monitoring a property, the monitoring system comprising:
one or more processors; and
one or more storage devices, wherein the one or more storage devices store instructions that, when processed by the one or more processors, cause the one or more processors to perform operations, the operations comprising:
determining, by the monitoring system and based on sensor data generated by one or more sensors installed at the property, an estimated time that a person will depart the property after detecting that the person is preparing to leave the property;
determining, by the monitoring system and based on the estimated time, whether a vehicle from a ride-sharing service will be within a predetermined vicinity of the property within the estimated time that the person will depart the property;
in response to a determination that the vehicle from the ride-sharing service will be within the predetermined vicinity of the property within the estimated time that the person will depart the property:
determining, using an indication that the monitoring system has been armed, that the person is leaving the property; and
based on determining that the person is leaving the property, notifying, by the monitoring system, the person that the vehicle is available to pick the person up.

2. The system of claim 1, wherein the operations comprise:
receiving the sensor data that indicates a sensor data sequence, wherein determining that the person is leaving the property uses (a) the sensor data sequence and (b) the indication that the monitoring system has been armed.

3. The system of claim 2, wherein receiving the sensor data that indicates the sensor data sequence comprises:
receiving sensor data from (i) a motion sensor and (ii) a flow rate water sensor, between a first time and a second time, indicating two or more of (i) movement in a bedroom, (ii) movement in a bathroom, (iii) water use in a bathroom, (iv) movement in a kitchen, or (v) appliance use in a kitchen.

4. The system of claim 1, the operations further comprising:
transmitting a request that hails the vehicle of the ride-sharing service; and
wherein the notification includes data indicating that the vehicle of the ride-sharing service has been hailed.

5. The system of claim 1,
wherein the notification includes a prompt that asks the person whether the person wants to transmit a request to hail the vehicle of the ride-sharing service, and the operations further comprise:
receiving, by the monitoring system, data indicative of the request, from the person, to hail the vehicle of the ride-sharing service.

6. The system of claim 1, the operations further comprising:
based on a determination that the vehicle from the ride-sharing service will not be within the predetermined vicinity of the property within a predetermined amount of time of the estimated time that the person will depart the property:
receiving, by the monitoring system, data indicating that the person is leaving the property; and
based on receiving the data indicating that the person is leaving the property, transmitting, by the monitoring system, an instruction that is configured to start a vehicle available to transport the person.

7. The system of claim 1, wherein determining that the person located at the property is preparing to leave the property comprises:
determining that the person located at the property is preparing to leave the property based on the sensor data from both a motion sensor and a flow rate water sensor.

8. The system of claim 1, wherein the operations comprise:
receiving, by the one or more sensors, second sensor data that indicates that a front door of the property has been opened, wherein determining that the person is leaving the property uses (i) the second sensor data and (ii) the indication that the monitoring system has been armed.

9. The system of claim 1, wherein the sensor data comprises historical sensor data that indicates when the person previously left the property.

10. A computer-implemented method comprising:
determining, by a monitoring system that includes one or more computers and based on sensor data generated by one or more sensors installed at a property, an estimated time that a person will depart the property after detecting that the person is preparing to leave the property;
determining, by the monitoring system and based on the estimated time, that a vehicle from a ride-sharing service will be within a predetermined vicinity of the property within the estimated time that the person will depart the property;
in response to a determination that the vehicle from the ride-sharing service will be within the predetermined vicinity of the property within the estimated time that the person will depart the property:
determining, using an indication that the monitoring system has been armed, that the person is leaving the property; and
based on determining that the person is leaving the property, notifying, by the monitoring system, the person that the vehicle is available to pick the person up.

11. The method of claim 10, the comprising:
transmitting a request that hails the vehicle of the ride-sharing service; and
wherein the notification includes data indicating that the vehicle of the ride-sharing service has been hailed.

12. The method of claim 10,
wherein the notification includes a prompt that asks the person whether the person wants to transmit a request to hail the vehicle of the ride-sharing service, and
receiving, by the monitoring system, data indicative of the request, from the person, to hail the vehicle of the ride-sharing service.

13. The method of claim 10, wherein determining that the person located at the property is preparing to leave the property comprises:
determining that the person located at the property is preparing to leave the property based on the sensor data from both a motion sensor and a flow rate water sensor.

14. The method of claim 10, comprising:
receiving, by the one or more sensors, second sensor data that indicates that a front door of the property has been opened, wherein determining that the person is leaving the property uses (i) the second sensor data and (ii) the indication that the monitoring system has been armed.

15. The method of claim 10, wherein the sensor data comprises historical sensor data that indicates when the person previously left the property.

16. A non-transitory computer-readable medium storing software comprising instructions executable by a monitoring system that includes one or more computers which, upon such execution, cause the one or more computers to perform operations comprising:
determining, by the monitoring system and based on sensor data generated by one or more sensors installed at a property, an estimated time that a person will depart the property after detecting that the person is preparing to leave the property;
determining, by the monitoring system and based on the estimated time, whether a vehicle from a ride-sharing service will be within a predetermined vicinity of the property within the estimated time that the person will depart the property;
in response to a determination that the vehicle from the ride-sharing service will be within the predetermined vicinity of the property within the estimated time that the person will depart the property:
determining, using an indication that the monitoring system has been armed, that the person is leaving the property; and
based on determining that the person is leaving the property, notifying, by the monitoring system, the person that the vehicle is available to pick the person up.

17. The medium of claim 16, the operations further comprising:
transmitting a request that hails the vehicle of the ride-sharing service; and
wherein the notification includes data indicating that the vehicle of the ride-sharing service has been hailed.

18. The medium of claim 16,
wherein the notification includes a prompt that asks the person whether the person wants to transmit a request to hail the vehicle of the ride-sharing service, and the operations further comprise:
receiving, by the monitoring system, data indicative of the request, from the person, to hail the vehicle of the ride-sharing service.

19. The medium of claim 16, the operations further comprising:
based on a determination that the vehicle from the ride-sharing service will not be within the predetermined vicinity of the property within a predetermined amount of time of the estimated time that the person will depart the property:
receiving, by the monitoring system, data indicating that the person is leaving the property; and
based on receiving the data indicating that the person is leaving the property, transmitting, by the monitoring system, an instruction that is configured to start a vehicle available to transport the person.

* * * * *

UNITED STATES PATENT AND TRADEMARK OFFICE
CERTIFICATE OF CORRECTION

PATENT NO. : 11,915,171 B2
APPLICATION NO. : 16/952163
DATED : February 27, 2024
INVENTOR(S) : Stephen Scott Trundle It is certified that error appears in the above-identified patent and that said Letters Patent is hereby corrected as shown below:

On the Title Page

Column 2 Item (57), (Abstract), Line 16, after "available" insert -- to --.

In the Claims

In Claim 11, Column 17, Line 39, before "comprising:" delete "the".

Signed and Sealed this
Ninth Day of April, 2024

Katherine Kelly Vidal
*Director of the United States Patent and Trademark Office*